(12) United States Patent
Sunol et al.

(10) Patent No.: US 8,863,737 B2
(45) Date of Patent: Oct. 21, 2014

(54) SUSTAINED MODULATION OF TEMPERATURE OF SELF HEATING CHEMICAL SYSTEM

(75) Inventors: Sermin G. Sunol, Lutz, FL (US); Aydin K. Sunol, Lutz, FL (US)

(73) Assignee: University of South Florida, Tampa, FL (US)

( * ) Notice: Subject to any disclaimer, the term of this patent is extended or adjusted under 35 U.S.C. 154(b) by 187 days.

(21) Appl. No.: 13/178,078

(22) Filed: Jul. 7, 2011

(65) Prior Publication Data

US 2012/0006314 A1  Jan. 12, 2012

Related U.S. Application Data

(63) Continuation of application No. PCT/US2010/020352, filed on Jan. 7, 2010.

(60) Provisional application No. 61/142,915, filed on Jan. 7, 2009.

(51) Int. Cl.
*F24J 1/00* (2006.01)
*C09K 5/18* (2006.01)

(52) U.S. Cl.
CPC ..... *C09K 5/18* (2013.01); *F24J 1/00* (2013.01)
USPC ............ 126/263.09; 126/263.04; 126/263.07; 126/263.08

(58) Field of Classification Search
USPC ............ 126/263.09, 263.01, 263.04, 263.07, 126/263.08
See application file for complete search history.

(56) References Cited

U.S. PATENT DOCUMENTS

| 3,871,357 A | 3/1975 | Grosso et al. |
| 3,878,118 A | 4/1975 | Watson |
| 4,057,047 A | 11/1977 | Gossett |
| 4,142,508 A * | 3/1979 | Watson .................... 126/263.07 |
| 4,559,921 A | 12/1985 | Benmussa |
| 4,627,972 A | 12/1986 | Gioffre et al. |
| 4,793,323 A | 12/1988 | Guida et al. |

(Continued)

FOREIGN PATENT DOCUMENTS

| EP | 1439213 A1 | 7/2004 |
| WO | 9805906 A1 | 2/1998 |

(Continued)

OTHER PUBLICATIONS

Extended European Search Report for European patent application No. 10729505.7 which corresponds to PCT/US2010020352.

(Continued)

*Primary Examiner* — Kenneth Rinehart
*Assistant Examiner* — Bao D Nguyen
(74) *Attorney, Agent, or Firm* — Robert J. Varkonyi; Smith & Hopen, P.A.

(57) ABSTRACT

Exothermic reactions are used in self heating products, such as food, beverages, and clothing. Temperature peaks are important as heat can cause user injuries or increase pressures within the heating container to unsafe levels. Disclosed is a composition that modulates chemical reactions by control of the reaction initiation. Solid exothermic reactants, like calcium oxide and zeolite, are wetted with a combination of water and at least one surfactant, such as polyethylene glycol. The use of surfactants limits the initial rate of wetting, and also provides modulation of the reaction by changing phase. Optional addition of weak acids or acid salts modulated temperature and pH.

15 Claims, 7 Drawing Sheets

(56) References Cited

U.S. PATENT DOCUMENTS

| | | | |
|---|---|---|---|
| 5,018,505 A | 5/1991 | Suzuki et al. | |
| 5,035,230 A | 7/1991 | Steidl et al. | |
| 5,117,809 A | 6/1992 | Scaringe | |
| 5,168,708 A | 12/1992 | Siegel | |
| 5,230,216 A | 7/1993 | Siegel | |
| 5,295,475 A | 3/1994 | Kaneko | |
| 5,355,869 A | 10/1994 | Pickard et al. | |
| 5,370,221 A | 12/1994 | Magnusson et al. | |
| 5,388,565 A | 2/1995 | Ou | |
| 5,465,707 A | 11/1995 | Fulcher et al. | |
| 5,483,949 A | 1/1996 | James | |
| 5,494,598 A | 2/1996 | Hughes | |
| 5,542,418 A | 8/1996 | James | |
| 5,593,792 A | 1/1997 | Farrier et al. | |
| 5,626,022 A | 5/1997 | Scudder et al. | |
| 5,628,304 A | 5/1997 | Freiman | |
| 5,738,082 A | 4/1998 | Page et al. | |
| 5,747,004 A | 5/1998 | Giani et al. | |
| 5,935,486 A | 8/1999 | Bell et al. | |
| 5,984,953 A | 11/1999 | Sabin et al. | |
| 6,116,231 A | 9/2000 | Sabin et al. | |
| 6,245,729 B1 | 6/2001 | Wei et al. | |
| 6,289,889 B1 | 9/2001 | Bell et al. | |
| 6,341,602 B1 | 1/2002 | Fulcher | |
| 6,640,801 B2 | 11/2003 | Sabin et al. | |
| 6,644,383 B2 * | 11/2003 | Joseph et al. | 165/46 |
| 6,705,309 B2 | 3/2004 | Searle et al. | |
| 2002/0174863 A1 | 11/2002 | Saric et al. | |
| 2003/0111637 A1 * | 6/2003 | Li et al. | 252/67 |
| 2003/0116452 A1 | 6/2003 | Saric et al. | |
| 2005/0224388 A1 | 10/2005 | Saric et al. | |
| 2006/0005827 A1 | 1/2006 | Consoli et al. | |
| 2007/0000484 A1 * | 1/2007 | Magill et al. | 126/263.02 |
| 2007/0295936 A1 * | 12/2007 | Byrne et al. | 252/186.1 |
| 2008/0283036 A1 * | 11/2008 | Dodo | 126/263.02 |

FOREIGN PATENT DOCUMENTS

| | | |
|---|---|---|
| WO | 0201129 A1 | 1/2002 |
| WO | 2005037953 A1 | 4/2005 |
| WO | 2007016416 A2 | 2/2007 |
| WO | 2007087039 A2 | 8/2007 |

OTHER PUBLICATIONS

Flameless Ration Heater (FRH), http://www.mreinfo.com/us/mre/frh.html, accessed Jan. 25, 2009.

Severson et al., Self-Heating Latte Cans Bring Out Lawyers, The New York Times, May 2, 2006.

Severson, Taking the Heat Out of the Kitchen, The New York Times, May 11, 2005.

International Search Report for International application No. PCT/US06/47621, dated Oct. 2, 2007.

International Search Report for International application No. PCT/US2010/020352, dated Jul. 27, 2010.

USPTO Office Action for U.S. Appl. No. 11/610,192, Notification Date Jul. 11, 2011.

USPTO Office Action for U.S. Appl. No. 11/610,192, Notification Date Oct. 25, 2010.

USPTO Office Action for U.S. Appl. No. 11/610,192, Notification Date Sep. 25, 2009.

* cited by examiner

SUSTAINED MODULATION OF TEMPERATURE OF SELF HEATING CHEMICAL SYSTEM

CROSS REFERENCE TO RELATED APPLICATIONS

This application is a continuation of prior filed International Application, Serial Number PCT/US2010/020352 filed Jan. 7, 2010, which claims priority to U.S. provisional patent application No. 61/142,915 filed Jan. 7, 2009 which is hereby incorporated by reference into this disclosure.

FIELD OF INVENTION

This invention relates to temperature modulation. Specifically, the invention provides a novel method of modulating the temperature of products by generating a sustained exothermic reaction.

BACKGROUND OF THE INVENTION

Many self-heating products are emerging in the marketplace. The applications include products for food, beverages, and hand warmers. There are many areas such as disposable wipes where an unmet need exists is in the application of the technology. These applications, as well as others, require self-heating through the reaction of chemicals. The initiation and control of these reactions, retention and distribution of heat, and handling of materials are key issues. These issues are only partially handled for various products in the market. One key area not addressed in the market is a sustained modulation of heat.

In the initiation of these heating reactions, control of these reactions, retention and distribution of heat, and handling of materials are key issues that are partially handled for various products in the market. The temperature peak for a heating system is typically not to reach above 100° C., so that steam is not generated and pressures within the heating container do not increase significantly.

Many self-heating cans have dual chambers; an inner chamber that holds food or drink and the outer chamber houses chemicals that undergo the exothermic reaction. For example, a self-heating coffee marketed under the Wolfgang Puck name, was recently manufactured. The self-heating cans were activated by pushing a plastic button on the bottom, allowing water to flow into a sealed inner cone filled with quicklime, which is mostly calcium oxide, and heating the coffee to 145° F. in six to eight minutes. When the user wants to heat the contents of the can, they pull a ring on the can that breaks the barrier separating the chemicals in the outer chamber. After the heat from the reaction has been absorbed by the food, the user can enjoy a hot meal or drink. (Kim Severson, Taking the Heat Out of the Kitchen, The NY Times, May 11, 2005). However, the technology is not yet common, largely due to the expense of the cans and problems with uneven heating of their contents. The Wolfgang Puck coffee was recalled due to complaints that the cans were too hot or cold, or that they otherwise malfunctioned. (Kim Severson & Melanie Warner, Self-Heating Latte Cans Bring Out Lawyers, The NY Times, May 2, 2006). There were allegations that the cans overheated, spurted product from the can, meltdowns, curdled product, and exploded.

As such, there exists an unmet need in the art to generate controlled and/or modulated exothermic reactions.

SUMMARY OF THE INVENTION

This invention provides a method to modulate chemical reactions that allow tuning of substrate temperature profiles through sequestering of several exothermic reactions, regulation of reaction, heat and mass transfer rates, and control of the reaction initiation. The present invention broadens the applicability of the chemical used in self-heating products to extend the release of heat, particularly useful in food and beverages, through providing extended release without the need for encapsulation. The invention addresses these issues with an inexpensive, simple, safe, and environmentally-friendly solution.

The exothermic reactants comprise a first solid reactant, a second solid reactant, and a liquid reaction mix. The first solid reactant may be a metal oxide, calcium carbonate, calcium sulfate, calcium chloride, cerous chloride, cesium hydroxide, sodium carbonate, ferric chloride, copper sulfate, magnesium sulfate, magnesium perchlorate, aluminum bromide, calcium aluminum hydride, aluminum chloride, and sulfur trioxide, or combinations thereof. In specific embodiments, the metal oxide is calcium oxide, barium oxide, strontium oxide, sodium oxide, potassium oxide, magnesium oxide, lithium oxide, or combinations thereof. The first solid reactant may optionally be added as a powder, granular, and prilled form.

The second solid reactant is zeolite or other porous exothermic reactant. The solid reactants are wetted by a liquid reaction mix of water and at least one surfactant. The invention provides modulation of heat generation and dissipation through incorporation of components such as glycerol and mono-ethylene glycol, and polyethylene glycol in the formation. It has been found that in specific embodiments, it is useful to add the surfactant at a water-to-surfactant ratio of over 1, or at a ratio of between 3 and 10. Also, in the case of high polymer weight polymers, the composition provides extended heat release due to phase change. As such the self-heating chemical system uses one or more primary solid reactants for exothermic reactions, such as calcium oxide, and one or more porous solid components, like zeolite, that can serve as a heat sink and conductor of heat as well as under going chemical transformations that release heat.

Optionally, one or more weak acids or acid salts is added for sustained modulation of temperature and pH. Some exemplary weak acids are citric acid, tartaric acid, oxalic acid, orthophosphoric acid, and sulfamic acid; and exemplary acid salts sodium hydrogen sulfate and potassium hydrogen sulfate. The rate of heat generation coupled with mass and energy transfer rates to or from system(s) allows modulation of the temperature of systems. The modulation can be further enhanced by controlled release and availability of some of the components. This method provides with a class of self-heating product applications and focuses on the modulation of temperature through sequestering of reactions with different rates, heat release through dissolution, heat release through mixing, heat release through sorption, heat release through phase change as well as controlling mass and heat transfer rates.

In certain embodiments, hydration of encapsulated and/or non-encapsulated oxides, such as calcium oxide and/or magnesium oxide and dehydrated and/or dehydrated zeolite coupled with control of pH of the mixture through compounds such as citric acid, provide sustained heat retention tailored for specific applications.

The invention also provides a self-heating package having temperature changing element. The temperature changing element comprises a solid reactant containment chamber disposed on the wall of the outer wall, a liquid reactant containment chamber disposed adjacent to the solid containment chamber, wherein the liquid containment chamber is in fluid communication with the lumen of the solid containment chamber, a rupturable barrier disposed between the solid reactant containment chamber and the liquid reactant containment chamber, wherein the rupturable barrier is adapted to control flow of fluids between the solid reactant containment chamber and the liquid reactant containment chamber, and an item pocket disposed adjacent to the solid reactant containment chamber and the liquid reactant containment chamber. The containment membranes of the temperature changing element are optionally composed of a moisture impermeable layer. Exemplary materials include metalized film, foil laminate film, and formed metal sheet. In some embodiments, the rupturable barrier between the solid reactant containment chamber and liquid reactant containment chamber is a frangible seal, or a weakened portion of the liquid containment membrane seal. The solid reactant containment chamber may be under vacuum to enhance the wetting of the solid reactants.

The temperature changing element uses an exothermic reaction to heat an item in the package. Useful compositions comprise a first solid reactant, a second solid reactant, and a liquid reaction mix. The first solid reactant may be a metal oxide, calcium carbonate, calcium sulfate, calcium chloride, cerous chloride, cesium hydroxide, sodium carbonate, ferric chloride, copper sulfate, magnesium sulfate, magnesium perchlorate, aluminum bromide, calcium aluminum hydride, aluminum chloride, and sulfur trioxide, or combinations thereof. In specific embodiments, the metal oxide is calcium oxide, barium oxide, strontium oxide, sodium oxide, potassium oxide, magnesium oxide, lithium oxide, or combinations thereof.

The second solid reactant is zeolite or other porous exothermic reactant. The solid reactants are wetted by a liquid reaction mix of water and at least one surfactant. The invention provides modulation of heat generation and dissipation through incorporation of components such as glycerol and mono-ethylene glycol, and polyethylene glycol in the formation. Optionally, one or more weak acids or acid salts is added to the liquid reaction mix, if in liquid form, or to the solid reactants, for solid forms. Some exemplary weak acids are citric acid, tartaric acid, oxalic acid, orthophosphoric acid, and sulfamic acid; and exemplary acid salts sodium hydrogen sulfate and potassium hydrogen sulfate.

The solid reactants are disposed in the solid reactant chamber, such as fixing the reactants to the inner face of the solid reactant containment chamber, with the liquid reaction mix disposed in the liquid containment chamber.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

The present invention is a temperature changing package 10 for use with an item 20 to be heated with an exothermic reaction upon activation. The disclosed method pertains to a class of self heating product applications and focus on the modulation of temperature through sequestering of reactions with different rates, heat as well as mass transfer rates controlling. This invention relates to a chemical mix that allows sequencing. The disclosure will focus on heating an item 20 with an exothermic chemical reaction. Exemplary, but non-limiting, exothermic chemical reactions, include water reacting with quicklime (Calcium Oxide), calcium chloride, magnesium sulfate, and/or anhydrous zeolite formations, electrochemical systems (e.g., a magnesium/magnesium alloy coupled with an electrolyte solution), crystallization of a super-cooled saturated salt solution, and combinations thereof.

As used herein, "Activation" is a method or action taken to initiate an exothermic chemical reaction system. Activation may be characterized by the application of a linear force, torsional bending, removal of a separation, or combinations thereof.

In some embodiments, an integrated self-heating package is formed from a multiple layered structure. "Integrated", as used herein, means that a temperature changing element is part of the packaging rather than a separate unit located within the packaging.

Figure 1:
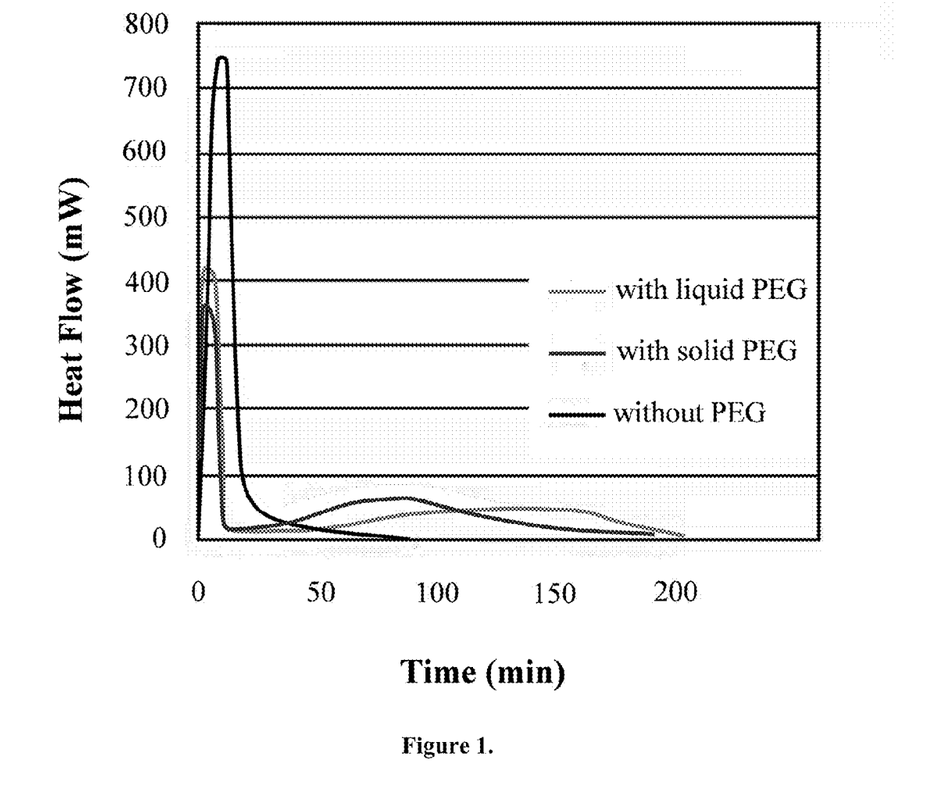
FIG. 1 is a graph illustrating the heat evolution after wetting of the CaO and zeolite mix.

The exothermic reaction between CaO and water in the presence of Zeolite has a complex mechanism. There are at least two steps involved in the reaction mechanism. The first step is the wetting of CaO and Zeolite surfaces, seen as the first peak in FIG. 1. Once the water is adsorbed on the surface and the surface is wetted, hydrolysis reaction between CaO and water starts, seen as the second peak in FIG. 1. This reaction occurs in rapid fashion, shown in FIG. 1, with most of the heat released within a maximum of 10-20 minutes.

This invention provides means to decrease the reaction rate, which is useful for some application purposes, such as prolonged food and beverage heating and cooling. A continuous use of heat is possible for an extended time up to a few hours instead of 10-20 minutes. Another reason for decreasing the reaction rate is to limit the heat produced at the first stage of the reaction. The first sharp peak in the heat evolution curve is an indication of rapid increase in temperature in the self heating system. This excessively high temperature may not be desirable due to safety concerns, such as contact with the heating system (i.e. burn injuries) or critical pressure build-up in the heating container which may result in rupture of the system. One way of controlling the reaction rate is through retarding the wetting step so that the reactions are retarded as well.

Exothermic reactants useful in the present invention include metal oxides, such as calcium oxide, barium oxide, strontium oxide, sodium oxide, potassium oxide, magnesium oxide, and lithium oxide. Other useful compounds include calcium carbonate, calcium sulfate, calcium chloride, cerous chloride, cesium hydroxide, sodium carbonate, ferric chloride, copper sulfate, magnesium sulfate, magnesium perchlorate, aluminum bromide, calcium aluminum hydride, aluminum chloride, sulfur trioxide (alpha form), zeolites, such as Carbsorb 500 and other mineral chabazite, mixtures thereof and other known exothermic reaction systems known in the art. The solid materials can be in an anhydrous form and used as a powder, granular, and/or prilled form. The components are typically hydroscopic and readily dissolve or react with liquid reactants, such as water, to emit heat.

Figure 2:
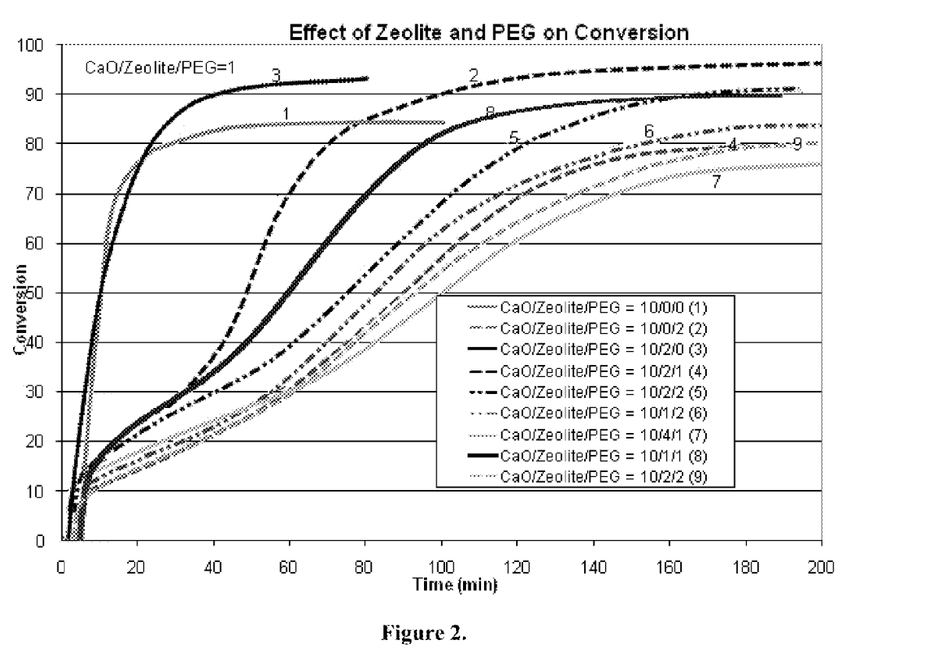
FIG. 2 is a graph illustrating the effect of different zeolite to PEG ratios on conversion of CaO and zeolite to the byproduct.

The solid reactants are hydrolyzed with liquid components, consisting of water and an additional a surfactant. The surfactant is added to the system to delay wetting of the solid reactant surface as well as the hydrolysis reaction between the solid reactant and adsorbed water intermediate. Non-limiting examples include glycerol and ethylene glycol, both monomer and polyethylene glycol (PEG) with different molecular weights. Monomers and low molecular weight polymers are in the liquid phase and are completely miscible with water. Higher molecular weight PEG exists in solid form. Experiments were performed with solid PEG mixed with CaO and Zeolite prior to the reaction. The effect of PEG was a function of CaO/Zeolite/PEG ratio, as seen in FIG. 2. In specific embodiments, a zeolite/PEG ratio of 0.5 to 5 is used, or alternatively a water/ethylene glycol ratio between 0.25 and 1.5. In the case of solid PEG, the initial heat produced is utilized for melting PEG. PEG, during later stages of reaction, changes phase back to solid form to release additional heat. Water and hydrocarbons were mixed in different ratios. Weak acids and acid salts may also be used in the invention, as such compounds provide additional heat through neutralization reactions. Exemplary compounds include acids such as citric acid, tartaric acid, oxalic acid, orthophosphoric acid, and sulfamic acid, and acid salts such as sodium hydrogen sulfate and potassium hydrogen sulfate.

Figure 3:
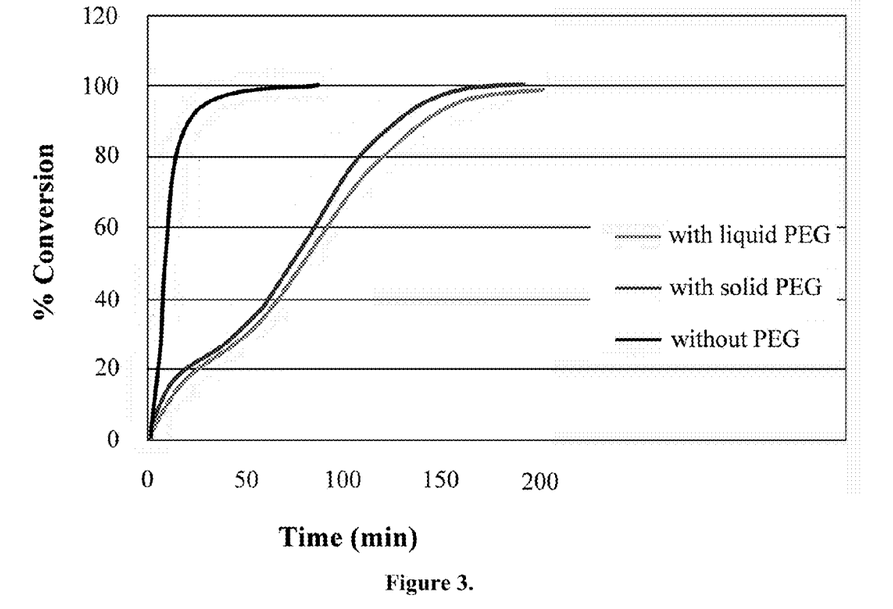
FIG. 3 is a graph of the conversion of CaO and zeolite to the byproduct.

CaO-Zeolite mixture then hydrolyzed with the surfactant/water mixture. The surfactant first adsorbed on the solid from the aqueous solution and resulted in limited wetting of the surface. For example, as surfactant dissolves off CaO, the CaO solid intermediate forms $Ca(OH)_2$. After that, the surfactant began to re-dissolve in water. This allowed contact of more water with the surface. The effect was a function of the water to PEG ratio, for which the water to poly- or mono-glycol ratio is more than one. It is noted that the preferred ratio range is 3-10. Further, as surfactant concentration increased, the rate of the hydrolysis reaction decreased. Also, hydrolysis rates decreased with increasing zeolite concentration. Conversion in the hydrolysis reaction versus time is shown in FIG. 3 for different ratios of surfactant and water- and CaO and zeolite.

EXAMPLE 1

Self-Heating Reaction System

Figure 4:
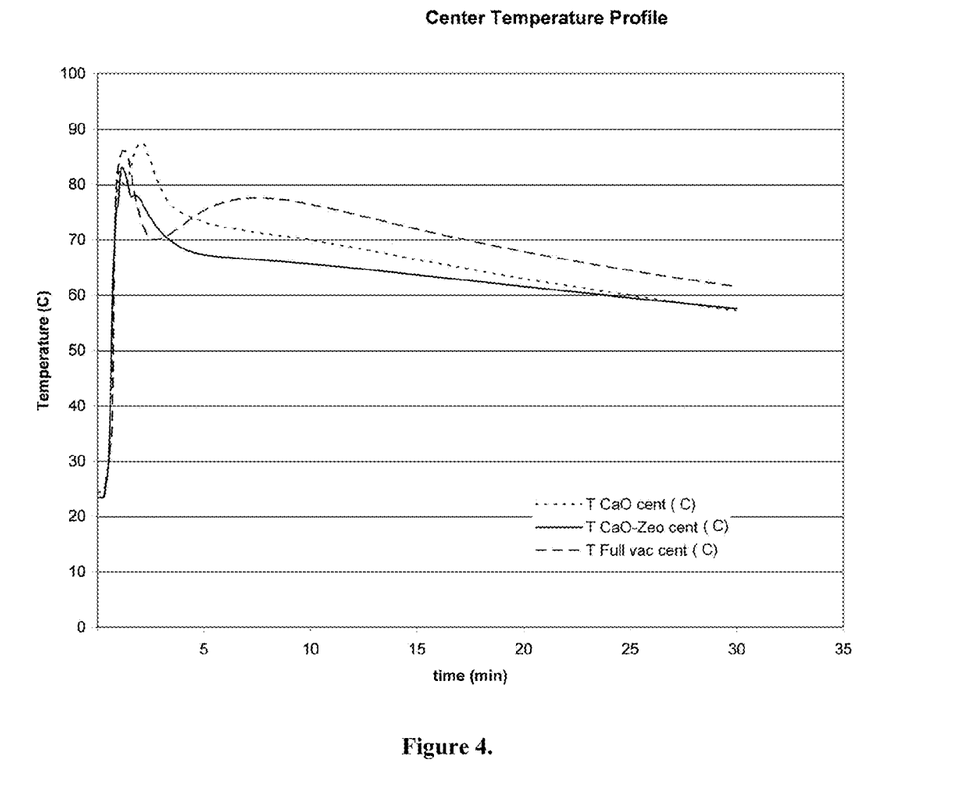
FIG. 4 is a graph illustrating the center temperature profile of the modulated exothermic reaction using CaO, zeolite, and citric acid.

The disclosed invention is a self-heating chemical system for sustained modulation of temperature. A self-heating chemical system using one or more primary components for exothermic reactions (such as calcium oxide), one or more porous components that can serve as a heat sink and conductor of heat as well as under going chemical transformations that release heat (zeolite). Optionally, a weak acid, such as citric acid, is added for sustained modulation of temperature and pH. Exothermic reactions, mixing of some chemicals, sorption of certain chemicals, phase changes in chemicals, and dissolution of some chemicals in solvents release heat during these operations. The rate of heat generation coupled with mass and energy transfer rates to or from system(s) allows modulation of the temperature of systems. This invention relates to a mixture that allows sequencing. The key reactions/transformation are as follows:

$CaO+H_2O \rightarrow Ca(OH)_2$
calcium oxide+water→calcium hydroxide
Zeolite+Water→Hydrated zeolite+Water
$CaO.MgO+H_2O \rightarrow Ca(OH)_2+MgO$
$MgO+H_2O \rightarrow Mg(OH)_2$ Referring to FIG. 4 there is a graph illustrating the heat generated as a function of time of a chemical mix composed of 77% CaO, 14% Zeolite, and 9% citric acid. In cases where citric acid is not used, the mix is 84% CaO and 16% Zeolite, with the total amount of chemicals and water used is the same regardless of use of a weak acid. As shown, the system can heat fast and maintain a uniform and high temperature. The combination of CaO and zeolite allow for effective, long-term exothermic reaction, as the CaO reacts quickly, while the zeolite stores heat and conducts the heat uniformly. This prevents excess hot spots and allows the zeolite to "hold" the heat to provide sustained heat transfer. Additionally, the Zeolite is exothermic, generating less heat than the CaO component and more slowly. Adding a surfactant, such as PEG, to the composition reduces the maximum temperatures reached and slows the reaction time, as seen in FIG. 2.

EXAMPLE 2

Self-Heating Packaging

Figure 5:
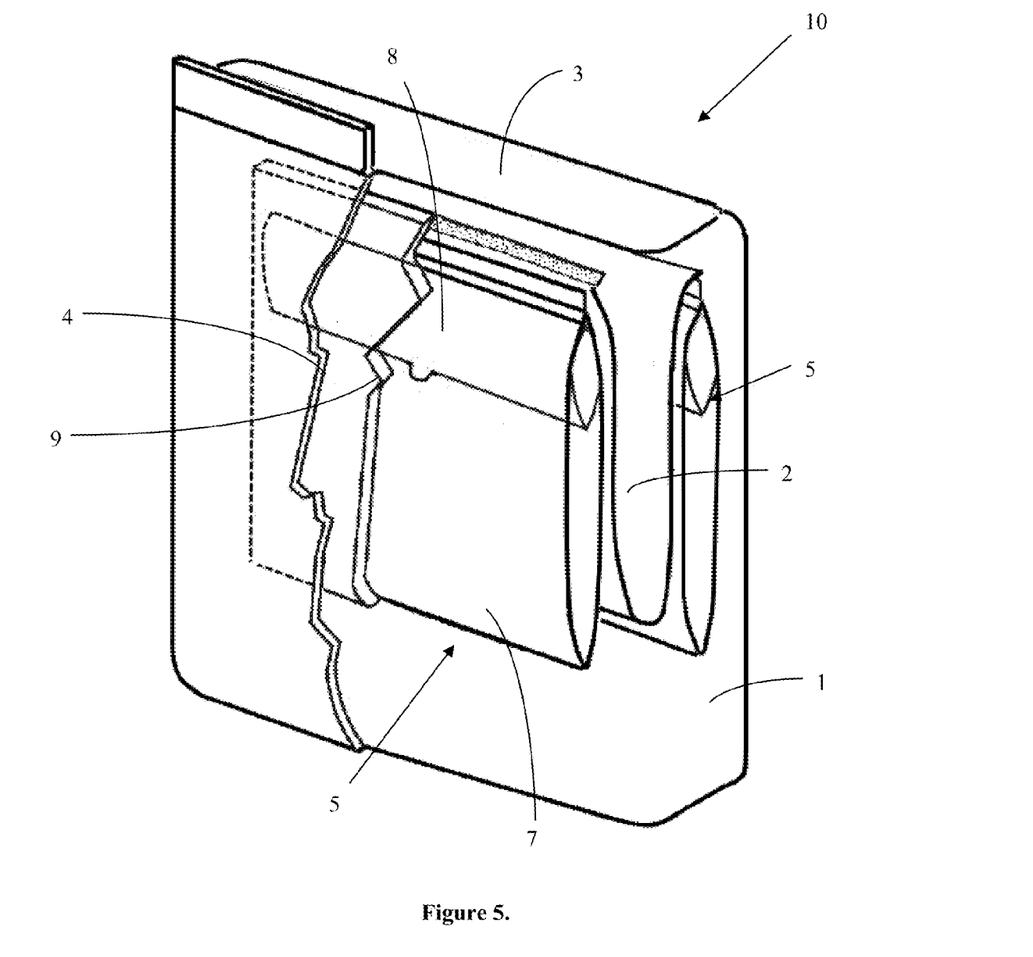
FIG. 5 is a diagram of the self-heating packaging system of the present invention.

Package 10 comprises item pocket 2 and temperature changing element 5, as seen in FIG. 5. Opening 3 is disposed on an outer surface of package 10, thereby permitting access to item 20.

Temperature changing element 5 may be suspended from the walls of package 10. Alternatively, temperature changing element 5 can be formed to be integral with outer walls 1, as seen in FIG. 5. Alternatively, temperature changing element 5 is optionally fixed to the inner surface of outer wall 1, such as by a strip of adhesive. In specific embodiments, the temperature changing element 5 is a self-contained, two-chamber unit comprises solid reactant containment membrane 7 and liquid reactant containment membrane 8. The temperature changing element 5, including the multiple components of temperature changing element 5, are housed in adjacent chambers separatable by a rupturable barrier or seal, such as a frangible seal.

As seen in the figure, liquid reactant containment membrane 8 is disposed within solid reactant containment membrane 7, however the only requisite is that the two membranes are oriented to allow the solid and liquid reactants to mix. Any orientation of the containment members that permits such mixing is envisioned, such as having the solid reactant containment membrane disposed within the liquid reactant containment membrane. Temperature changing element 5 can include water impermeable or moisture impermeable containment membranes 11 formed into a pouch having two or more containment chambers which separately contain the solid reactants in one and the liquid reactants in the other, prior to activation. The containment membranes may be formed from a metalized film or other material having a low moisture vapor transmission rate (MVTR), thereby limiting the release of liquid reactants until the seal or other device is broken. The membranes may be flexible or rigid, such as a metalized film, foil laminate film, MYLAR™, a formed metal sheet, or any other moisture and/or water impermeable material. Temperature changing element 5 can be permanently sealed about its periphery to include solid reactant containment membrane 7 and liquid reactant containment membrane 8. The containment membranes are sealed such that the materials contained therein cannot access item pocket 2 of package 10, preventing mixing with item 20. Heat-sealing, adhesive, or other attachment method may be used to affix the containment membranes to package 10. In some embodiments, temperature changing element 5 is partially or fully encased with insulation 4, thereby limiting the transfer of heat to outer walls 1 and, where temperature changing element 5 is fully encased, heat transfer to item 20 is also reduced.

Figure 6:
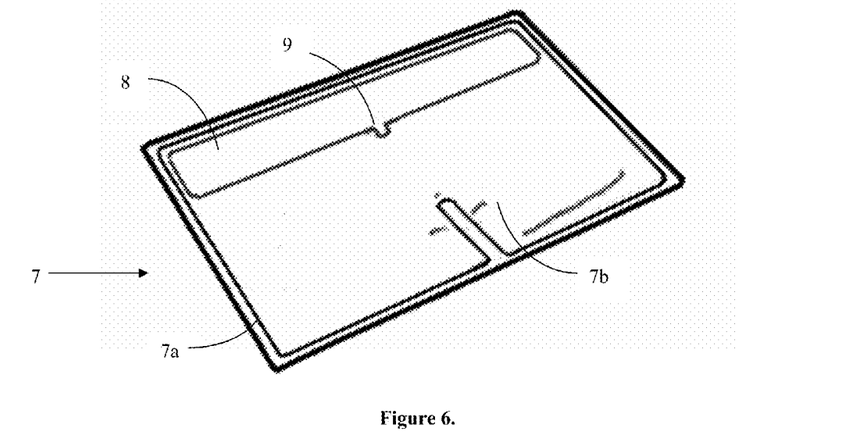
FIG. 6 is a diagram of an optional embodiment of the temperature changing element, showing the solid reactants divided by a seal.

The element may also include a seal about the periphery and across the width of the solid containment membrane to separate the solid containment membrane into smaller reactant compartments 7a and 7b, as seen in FIG. 6. The reactant compartments 7a and 7b can be connected by a gap in the seal to permit liquid reactants to readily flow between the two reactant compartments.

A seal or other device prevents mixing of the liquid and solid reactants until the desired time. The rupturable barrier, seal or other device used to prevent mixing of the liquid and solid reactants may be any known in the art. A non-limiting example includes frangible seal 9. Frangible seal 9 can be ruptured by pressure applied to one or more of the containment membranes. Alternatively, the seal between solid reactant containment membrane 7 and liquid reactant containment membrane 8 may include weakened portions of the seal between the containment membranes. The frangible seal can extend across all or a portion of the width of the heating element. In one embodiment, a frangible seal may be punctured by a method known in the art, such as scores, perforations, or materials such as pull tabs, metal shavings, and other items that can puncture the containment membrane or seal. Applying pressure to one of the containment membranes, such as by squeezing, pressing, or kneading, ruptures the seal. Upon compression of at least one of the containment membranes, or other method known to break the seal, the seal ruptures, permitting the liquid reactants to flow into the solid reactant containment membrane 7, thereby contacting the solid reactants.

In some embodiments, the solid components are under negative pressure, such as a slight vacuum. The vacuum provides an avenue for rapid and thorough mixing of the liquid reactants with the solid reactants. The resulting reaction avoids hot spots due to improper mixing that happens during the initial period. Furthermore, vacuumed containment results in more uniform and higher temperatures, at latter periods, upon mixing. Further, the porous zeolite allows intraparticle void space.

EXAMPLE 3

Self-Heating Towel Packaging

Figure 7:
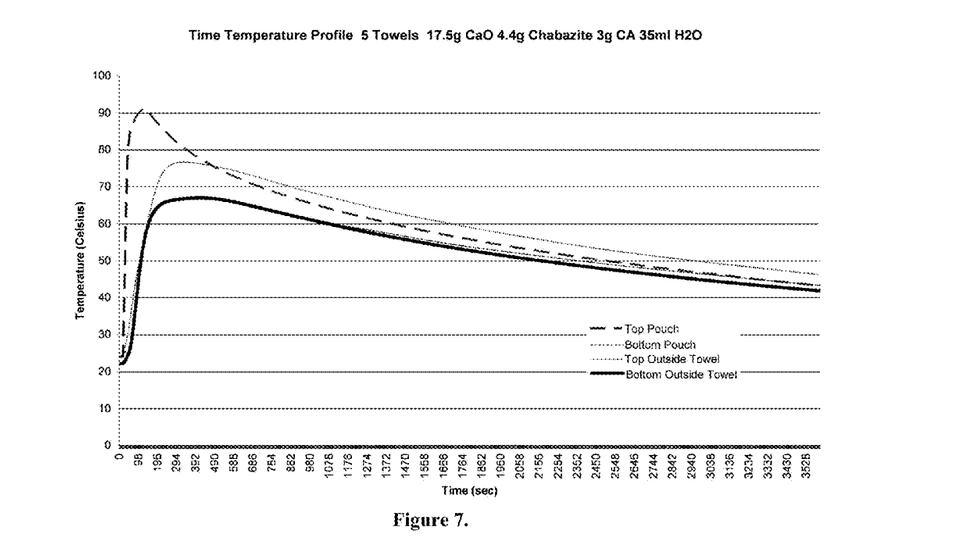
FIG. 7 is a graph illustrating temperature profiles for a system comprising 17.5 g CaO, 4.5 g zeolite, 3 g citric acid, and 35 ml water, used to heat 5 towels. The lines represent temperatures at various locations within the package.

Referring to FIG. 7 there is shown the time-temperature profile of a 5-towel system employing 7.5 g of CaO, 4.5 g Chabazite, 3 g citric acid, and 35 ml water. The figure illustrates temperature profiles of five disposable wash clothes heated using the aforementioned chemical system composed of chemicals containment (chemical pouch) and containment comprised of water (water pouch). All but water is in one pouch while water is in another pouch. When the chemicals are mixed the reaction is initiated to heat the adjacent wash clothes.

Figure 8:
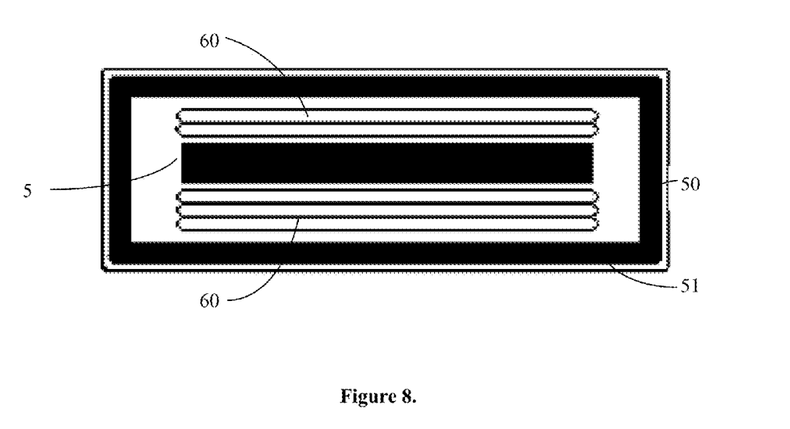
FIG. 8 is a diagram of a self-heating package system used to heat towels with the exothermic reaction of the present invention.
Figure 9:
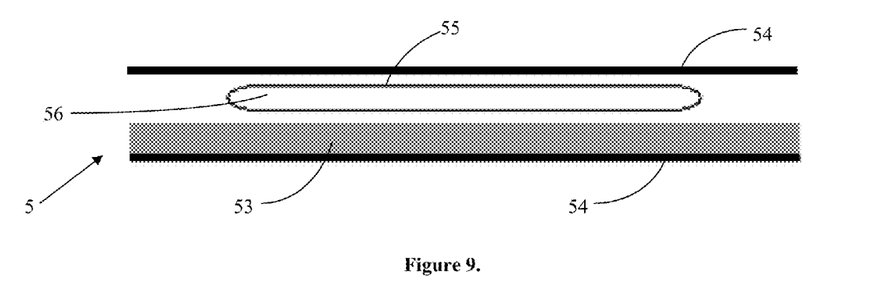
FIG. 9 is a diagram of a the thermal element of the self-heating package used to heat towels with the exothermic reaction of the present invention.

FIG. 8 illustrates a self-heating system for sustained and modulated heating of an item 60, such as towels, which may be wet towels or dry towels. The system includes package 50 which surrounds item 60 and temperature changing element 5. As seen in the figure, package 50 can have insulation 51 disposed on the interior of the packaging and integral with outer walls of the package. 1, Temperature changing element 5 is fixed to the inner surface of the package such that two item pockets are formed, one on either side of temperature changing element 5. In FIG. 9, temperature changing element 5 has been enlarged, showing the exothermic reactants encased in sealant film 54, thereby forming temperature element pouch 52. Exemplary include moisture impermeable containment membranes, such as those described for moisture impermeable containment membranes 11 above. Solid reactants 53 are disposed on the inner surface of sealant film 54, such as by affixing the solid reactants as is known in the art. Liquid reactant pouch 55 contains liquid reactants 56 and has a rupturable barrier, seal or other device, as discussed above. Braking the seal of liquid reactant pouch 55 allows liquid reactants 56 to wet solid reactants 53, initiating the exothermic reaction. As also contain a surfactant, discussed above, the reaction is controlled and modulated, reaching a lower maximum temperature and concurrently lasting longer. The solid reactants 53 are subjected to a vacuum while the liquid reactants 56 are at a higher pressure, such as atmospheric pressure. This can be accomplished by sealing liquid reactants 56 into liquid reactant pouch 55 at atmospheric pressure and inserting liquid reactant pouch 55 into temperature element pouch 52. Air is then removed from temperature element pouch 52, placing the solid reactants 53 under vacuum. The vacuum creates a pressure gradient for the water to move into temperature element pouch 52 and contact solid reactants 53. The vacuum also advantageously provides quicker and more even wetting of solid reactants 53. The zeolite or other porous material aids in the vacuum's effect and provides available space for liquid reactants 56 to permeate through solid reactants 53.

The present invention facilitates the time-temperature modulation of heating. Furthermore, components, principally the water which initiates the reaction is sequestered, while upon the rupture of the water pouch the chemical component system enables the effective missing of the water with the chemicals. In certain aspect, the two pouch system utilizes heating components such as CaO/Zeolite/Citric acid in an outer pouch that is vacuumed. The inner pouch contains the water. When you break the inner pouch by squeezing pouches, the inner pouch breaks and water rapidly permeates and diffuses into the chemicals.

In the preceding specification, all documents, acts, or information disclosed do not constitute an admission that the document, act, or information of any combination thereof was publicly available, known to the public, part of the general knowledge in the art, or was known to be relevant to solve any problem at the time of priority.

The disclosures of all publications cited above are expressly incorporated herein by reference, each in its entirety, to the same extent as if each were incorporated by reference individually.

While there has been described and illustrated specific embodiments of a modulated exothermic system, it will be apparent to those skilled in the art that variations and modifications are possible without deviating from the broad spirit and principle of the present invention. It is also to be understood that the following claims are intended to cover all of the generic and specific features of the invention herein described, and all statements of the scope of the invention which, as a matter of language, might be said to fall therebetween.

What is claimed is:

1. An exothermic reaction composition, comprising
a first solid reactant, selected from the group consisting of metal oxides, calcium carbonate, calcium sulfate, calcium chloride, cerous chloride, cesium hydroxide, sodium carbonate, ferric chloride, copper sulfate, magnesium sulfate, magnesium perchlorate, aluminum bromide, calcium aluminum hydride, aluminum chloride, and sulfur trioxide;
a second solid reactant, wherein the second solid reactant is zeolite; and
a liquid reaction mix, further comprising water and at least one surfactant;
wherein the combination of exothermic reaction composition components react upon activation to modulate heat generation.

2. The exothermic reaction composition of claim 1, wherein the metal oxide is selected from the group consisting of calcium oxide, barium oxide, strontium oxide, sodium oxide, potassium oxide, magnesium oxide, and lithium oxide.

3. The exothermic reaction composition of claim 1, wherein the first solid reactant is added in a form selected from the group consisting of a powder, granular, and prilled.

4. The exothermic reaction composition of claim 1, wherein the at least one surfactant is selected from the group consisting of glycerol and mono-ethylene glycol, and poly-ethylene glycol.

5. The exothermic reaction composition of claim 1, wherein the at least one surfactant is added at a water to surfactant ratio of over 1.

6. The exothermic reaction composition of claim 5, wherein the at least one surfactant is added at a water to surfactant ratio of between 3 and 10.

7. The exothermic reaction composition of claim 1, further comprising an acidic component, wherein the acidic component is selected from the group consisting of weak acids and acid salts.

8. The exothermic reaction composition of claim 7, wherein the weak acid is selected from the group consisting of as citric acid, tartaric acid, oxalic acid, orthophosphoric acid, and sulfamic acid.

9. The exothermic reaction composition of claim 7, wherein the acid salt is selected from the group consisting of sodium hydrogen sulfate and potassium hydrogen sulfate.

10. A self heating package, comprising:
a temperature changing element further comprising:
a solid reactant containment chamber disposed on an outer wall of the package;
wherein the solid reactant containment chamber is suspended from the walls of the package, integral with outer walls of the package, or fixed to the inner surface of an outer wall of the package;
a liquid reactant containment chamber disposed adjacent to the solid containment chamber, wherein the liquid containment chamber is in fluid communication with the lumen of the solid containment chamber;
a rupturable barrier disposed between the solid reactant containment chamber and the liquid reactant containment chamber, wherein the rupturable barrier is adapted to control flow of fluids between the solid reactant containment chamber and the liquid reactant containment chamber;
an exothermic reaction composition, further comprising:
a first solid reactant disposed in the solid reactant chamber, selected from the group consisting of metal oxides, calcium carbonate, calcium sulfate, calcium chloride, cerous chloride, cesium hydroxide, sodium carbonate, ferric chloride, copper sulfate, magnesium sulfate, magnesium perchlorate, aluminum bromide, calcium aluminum hydride, aluminum chloride, and sulfur trioxide;
a second solid reactant disposed in the solid containment chamber, wherein the second solid reactant is zeolite;
a liquid reaction mix disposed in the liquid containment chamber, further comprising water and at least one surfactant;
wherein the combination of exothermic reaction composition components react upon activation to modulate heat generation; and
an item pocket disposed adjacent to the solid reactant containment chamber and the liquid reactant containment chamber.

11. The self heating package of claim 10, wherein the containment membranes are composed of a moisture impermeable layer.

12. The self heating package of claim 11, wherein the moisture impermeable layer is composed of metalized film, foil laminate film, and formed metal sheet.

13. The self heating package of claim 10, wherein the rupturable barrier is selected from the group consisting of a frangible seal, and a weakened portion of the liquid containment membrane seal.

14. The self heating package of claim 10, wherein the solid reactant containment chamber is under vacuum.

15. The self heating package of claim 10, further comprising insulation disposed on the interior of the packaging and integral with outer walls of the package.

* * * * *